United States Patent
Clarke

(10) Patent No.: US 10,188,240 B2
(45) Date of Patent: Jan. 29, 2019

(54) POT LID STORAGE HOLDER

(71) Applicant: Dana S. Clarke, Bend, OR (US)

(72) Inventor: Dana S. Clarke, Bend, OR (US)

( * ) Notice: Subject to any disclaimer, the term of this patent is extended or adjusted under 35 U.S.C. 154(b) by 0 days.

(21) Appl. No.: 15/363,359

(22) Filed: Nov. 29, 2016

(65) Prior Publication Data

US 2018/0146827 A1  May 31, 2018

(51) Int. Cl.
| | |
|---|---|
| *A47J 47/16* | (2006.01) |
| *A47B 55/02* | (2006.01) |
| *A47B 77/14* | (2006.01) |
| *A47B 81/00* | (2006.01) |

(52) U.S. Cl.
CPC .............. *A47J 47/16* (2013.01); *A47B 55/02* (2013.01); *A47B 77/14* (2013.01); *A47B 81/00* (2013.01)

(58) Field of Classification Search
CPC ....... A47B 81/005; A47B 81/00; A47B 81/04; A47B 73/002; A47B 73/004; A47B 73/008; A47G 25/746; A47G 23/02; A47G 23/0208; A47G 23/0216; A47J 47/16
USPC .......... 24/11 C, 27, 566, 131 R, 129 C, 510; 211/120, 41.4, 75, 89.01, 106; 248/302, 248/312, 312.1, 230.7, 231.81, 112
See application file for complete search history.

(56) References Cited

U.S. PATENT DOCUMENTS

| | | | | |
|---|---|---|---|---|
| 384,130 A | * | 6/1888 | Comstock | D06F 53/00 24/131 R |
| 955,646 A | * | 4/1910 | Jorey | A47K 1/09 211/120 |
| 1,065,000 A | * | 6/1913 | Sarter et al. | A47J 47/16 211/41.11 |
| 1,108,055 A | * | 8/1914 | Wolfe et al. | A47G 25/746 211/120 |
| 1,157,578 A | * | 10/1915 | Petre | A47G 25/746 211/120 |
| 1,159,485 A | * | 11/1915 | Foster | A47G 29/18 211/74 |

(Continued)

FOREIGN PATENT DOCUMENTS

| | | |
|---|---|---|
| CN | 102920365 A | 2/2013 |
| CN | 202960256 U | 6/2013 |

(Continued)

OTHER PUBLICATIONS

Organize-It, "Cabinet Door Pot Lid Organizer," 1 page, publication date unknown, viewed Jul. 22, 2016.

(Continued)

*Primary Examiner* — Stanton L Krycinski
(74) *Attorney, Agent, or Firm* — Birdwell & Janke, LLP

(57) ABSTRACT

A pot lid storage holder, which may be used for storing a pot lid having a knob-shaped handle with a necked-down portion disposed between the pot lid and a relatively enlarged portion of the handle, and for storing a pot lid having a drawer-pull type handle. The pot lid storage holder includes first and second gripping elements projecting from a base, the first and second gripping elements configured to receive through an opening therebetween, in a downstream direction of insertion of the pot lid into the holder pointing toward the base, the necked-down portion of the handle, and to exert a compressive spring force on the necked-down portion that decreases with increasing depth of insertion.

24 Claims, 5 Drawing Sheets

(56) References Cited

U.S. PATENT DOCUMENTS

| | | | | |
|---|---|---|---|---|
| 1,222,072 A * | 4/1917 | Collis | A47G 25/746 | 211/120 |
| 1,368,754 A * | 2/1921 | Reinhard | D06F 53/00 | 24/131 R |
| 1,528,744 A | 3/1925 | Dix | | |
| 1,547,178 A * | 7/1925 | Long | A47G 29/18 | 232/41 E |
| 1,701,783 A * | 2/1929 | Law | A47G 25/746 | 160/348 |
| 1,711,730 A | 5/1929 | Gibson | | |
| 1,892,500 A * | 12/1932 | Bleckley | A47J 47/16 | 211/65 |
| 1,978,033 A * | 10/1934 | Suppes | A47G 29/18 | 248/230.1 |
| 2,017,252 A | 10/1935 | Lentz | | |
| 2,128,114 A * | 8/1938 | Benedetti | A47G 29/24 | 211/4 |
| 2,344,816 A * | 3/1944 | Hahn | A47L 13/512 | 248/113 |
| 2,430,624 A * | 11/1947 | Vollmer | A47G 29/08 | 211/120 |
| 2,608,305 A | 11/1948 | Sager | | |
| 2,507,886 A * | 5/1950 | Carlson | A47G 25/746 | 211/120 |
| 2,569,021 A * | 9/1951 | Rozanski | A47F 5/0884 | 211/120 |
| 2,707,052 A * | 4/1955 | Brown | A47K 1/09 | 211/120 |
| 2,778,588 A * | 1/1957 | Bruno | A47L 13/512 | 248/112 |
| 3,305,100 A * | 2/1967 | Barbee | A47L 13/512 | 211/120 |
| 3,370,820 A * | 2/1968 | Liss | A24F 19/0092 | 131/241 |
| 3,893,399 A * | 7/1975 | Lewis | B61D 45/001 | 24/115 K |
| 4,757,906 A * | 7/1988 | Ovitz, III | A47F 7/16 | 211/120 |
| 4,850,556 A * | 7/1989 | Otani | A47J 47/16 | 248/206.2 |
| 4,936,469 A * | 6/1990 | Drower | A47F 5/08 | 211/69.8 |
| 5,038,945 A * | 8/1991 | Melkonian | A47F 5/0087 | 211/41.11 |
| 5,170,978 A | 12/1992 | Hoffman | | |
| 5,207,334 A | 5/1993 | Lear | | |
| 5,297,766 A | 3/1994 | Hoffman | | |
| 5,419,443 A * | 5/1995 | Niederberger | A47L 13/512 | 211/70.6 |
| 5,570,794 A * | 11/1996 | Drower | A47F 7/0028 | 211/120 |
| 5,683,010 A | 11/1997 | Boyajian | | |
| 5,687,979 A * | 11/1997 | Plevka | B62B 1/20 | 280/47.19 |
| 5,711,436 A * | 1/1998 | Moeller | A47G 23/0208 | 211/106 |
| 5,727,697 A * | 3/1998 | Ricciardelli | A47F 7/0028 | 211/89.01 |
| 5,775,520 A * | 7/1998 | Drower | A47F 7/0028 | 211/120 |
| 5,779,066 A * | 7/1998 | Drower | A47F 5/08 | 211/120 |
| 5,810,308 A | 9/1998 | Lam | | |
| 5,896,720 A * | 4/1999 | Bond | E04D 13/12 | 24/336 |
| 6,003,688 A * | 12/1999 | Steidle | A47J 47/16 | 211/41.11 |
| 6,012,593 A * | 1/2000 | Knittel | A47J 47/16 | 211/181.1 |
| 6,070,837 A * | 6/2000 | Bond | F16L 3/13 | 248/71 |
| 6,386,379 B1 * | 5/2002 | Battaglia | A47B 96/00 | 211/106 |
| 6,419,194 B1 * | 7/2002 | LoSacco | A46B 17/02 | 248/110 |
| 6,997,329 B2 * | 2/2006 | Ohanian | A47J 47/16 | 211/181.1 |
| 7,500,580 B2 * | 3/2009 | Hawkins | B44D 3/123 | 220/736 |
| 7,984,814 B2 | 7/2011 | Didehvar | | |
| 8,069,999 B2 | 12/2011 | Kaveh | | |
| 8,157,111 B2 | 4/2012 | Didehvar | | |
| 8,517,323 B1 | 8/2013 | Gregory | | |
| 2004/0020883 A1 * | 2/2004 | Brokaw | A47F 7/0028 | 211/89.01 |
| 2004/0251222 A1 | 12/2004 | Ohanian | | |
| 2006/0186124 A1 * | 8/2006 | Sergianni | A47J 47/16 | 220/572 |
| 2007/0199908 A1 * | 8/2007 | Kasden | A47J 47/16 | 211/41.5 |
| 2008/0251472 A1 * | 10/2008 | Kasden | A47J 36/06 | 211/41.2 |

FOREIGN PATENT DOCUMENTS

| | | | |
|---|---|---|---|
| DE | 295 08 798 U1 | 11/1996 | |
| DE | 10112752 A1 * | 9/2002 | A47J 47/16 |
| EP | 2227994 A2 | 9/2010 | |
| GB | 435001 | 9/1935 | |
| GB | 674783 A * | 7/1952 | A47G 21/167 |

OTHER PUBLICATIONS

Google, "Images" for "pot lid organizer," 1 representative page, publication date unknown, viewed Jul. 22, 2016.

International Search Report and Written Opinion and related documents in PCT/US17/063617; dated Feb. 9, 2018, 12 pages.

* cited by examiner

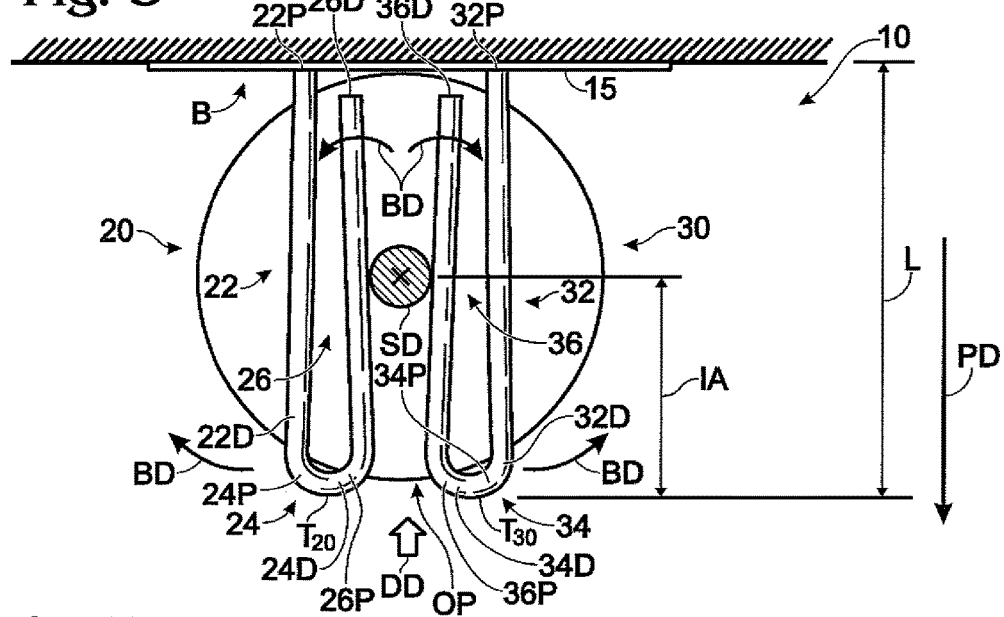
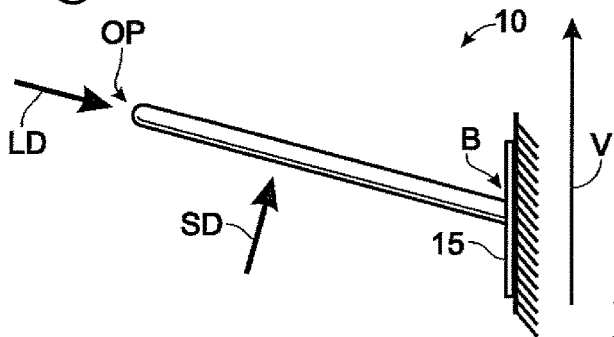
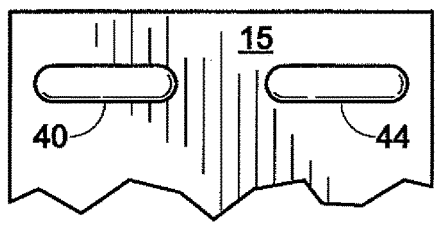
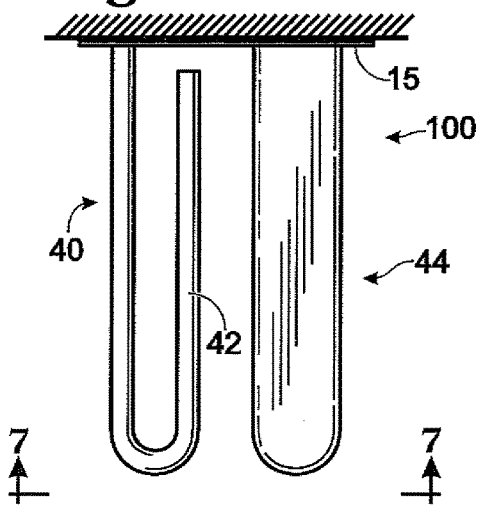

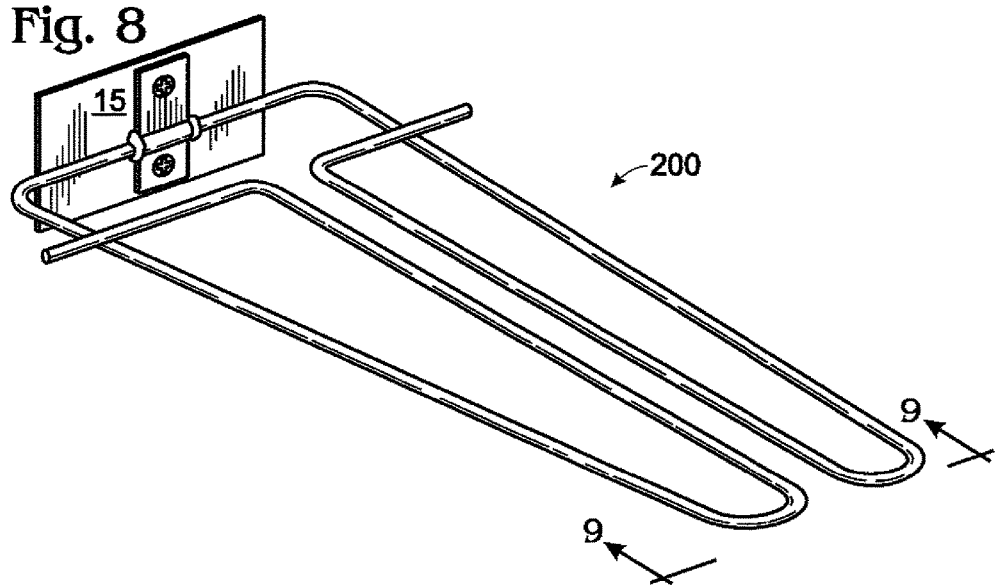
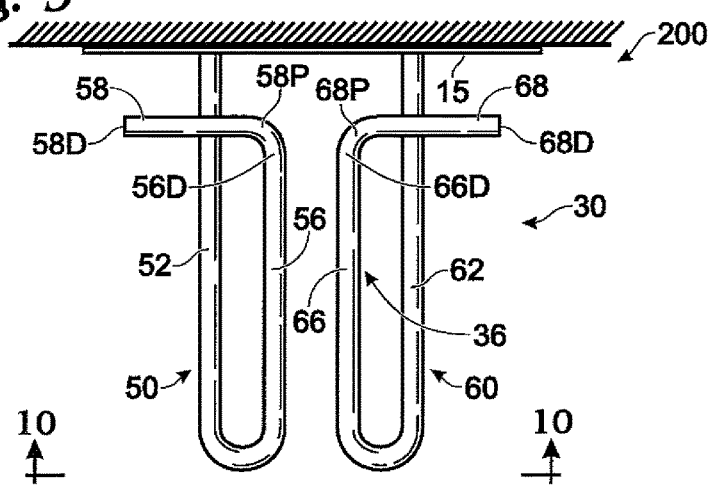
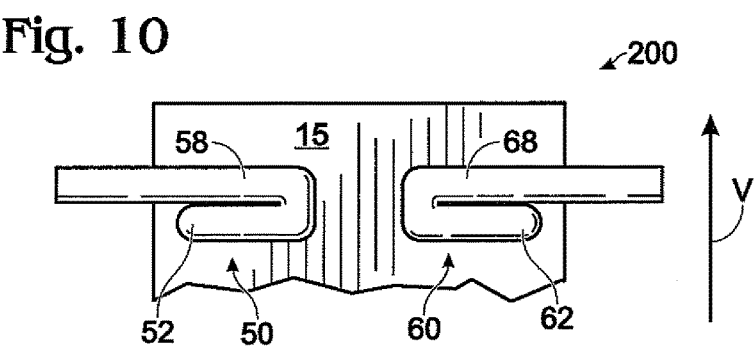

POT LID STORAGE HOLDER

FIELD OF INVENTION

The present invention relates to a device that may be used for organizing and storing pot lids; and more particularly, for organizing and storing, in a kitchen, the lids of pots used for cooking.

BACKGROUND

Kitchen pot lids are intended to become too hot for touching during use, so they are provided with, typically, a centrally disposed heat resisting handle. The handle is often knob-shaped, with a relatively narrow neck at the joinder of the handle with the pot lid, but sometimes pot lid handles are similar to drawer-pulls of the type often used on furniture drawers, which define an aperture through the handle through which the user grasps the handle by inserting his or her fingers.

The pot lids themselves are typically formed of metal or glass and their outer surfaces are often considered to be aesthetically important, sometimes to the point of being put on display in the kitchen as a source of pride for their owners.

Often, pot lid storage holders require that the pot lid make contact either with the storage holder itself or with a wall or cabinet surface, posing a risk of damage to either or both. Often too, these storage holders do not adequately secure the pot lids, posing a risk that they may fall out of the storage holder, particularly if the storage holder is mounted to a door or in a drawer that is subject to movement.

The holder disclosed in the cited reference CN 102920365 is apparently for hand-held use only, not for storing such pot lids, but its configuration allows for holding the pot lids by their handles and thereby avoiding potentially damaging contact between the pot lids and either the holder itself or other surfaces, and it avoids the risk that the pot lid could easily fall out of the holder. However, the configuration of this prior art holder allows for only a limited range of sizes of handle, and the manner in which the pot lid handle must be inserted into the holder would make its use as a storage holder inconvenient.

Accordingly, there is a need for a pot lid storage holder that provides the advantages of the prior art holder described immediately above, that also accommodates pot lids having handles in a wide variety of shapes, sizes and configurations, and is convenient to use.

SUMMARY

A pot lid storage holder is disclosed herein, which may be used for storing a pot lid having a knob-shaped handle with a necked-down portion disposed between the pot lid and a relatively enlarged portion of the handle, and for storing a pot lid having a drawer-pull type handle. The pot lid storage holder includes first and second gripping elements projecting from a base, the first and second gripping elements configured to receive through an opening therebetween, in a downstream direction of insertion of the pot lid into the pot lid storage holder pointing toward the base, the necked-down portion of the handle, and to exert a compressive spring force on the necked-down portion that decreases with increasing depth of insertion.

The first gripping element may have a structure-attachment portion, a return portion, and a pot-lid-handle-engaging portion, the structure-attachment portion connected to the base at a proximal end of the structure-attachment portion and terminating at a distal end of the structure-attachment portion, the return portion connected to the distal end of the structure-attachment portion at a proximal end of the return portion and terminating at a distal end of the return portion, the pot-lid-handle-engaging portion connected to the distal end of the return portion at a proximal end of the pot-lid-handle-engaging portion and terminating at a distal end of the pot-lid-handle-engaging portion, the return portion defining a terminus of the first gripping element that is spaced farther from the base than the structure-attachment and pot-lid-handle-engaging portions, the second gripping element defining a terminus corresponding to the terminus of the first gripping element, and also defining a pot-lid-handle-engaging portion corresponding to the pot-lid-handle-engaging portion of the first gripping element, the first and second gripping elements spaced apart from each other so as to define said opening, the first and second gripping elements configured so that, as a result of receiving the necked-down portion of the handle therebetween an insertion amount, (a) the pot-lid-handle-engaging portion of the first gripping element is elastically spread apart from the pot-lid-handle-engaging portion of the second gripping element, (b) the distal end of the pot-lid-handle-engaging portion of the first gripping element is spread farther apart from the pot-lid-handle-engaging-portion of the second gripping element than the proximal end of the pot-lid-handle-engaging portion of the first gripping element, and (c) the pot-lid-handle-engaging portions of the first and second gripping elements are not subjected to any substantial bending forces downstream of the necked-down portion of the handle regardless of the insertion amount, the pot-lid-handle-engaging portions of the first and second gripping elements providing for supporting the relatively enlarged portion of the handle and thereby holding the pot lid.

The second gripping element may likewise have a structure-attachment portion, a return portion, and a pot-lid-handle-engaging portion, the structure-attachment portion of the second gripping element connected to the base at a proximal end of the structure-attachment portion of the second gripping element and terminating at a distal end of the structure-attachment portion of the second gripping element, the return portion of the second gripping element connected to the distal end of the structure-attachment portion of the second gripping element at a proximal end of the return portion of the second gripping element and terminating at a distal end of the return portion of the second gripping element, the pot-lid-handle-engaging portion of the second gripping element connected to the distal end of the return portion of the second gripping element at a proximal end of the pot-lid-handle-engaging portion of the second gripping element and terminating at a distal end of the pot-lid-handle-engaging portion of the second gripping element, the return portion of the second gripping element defining a terminus of the second gripping element that is spaced farther from the base than the structure-attachment and pot-lid-handle-engaging portions of the second gripping element.

Either or both of the first and second gripping elements may include a respective support portion connected to the distal end of the respective pot-lid-handle-engaging portion at a proximal end of the respective support portion and terminating at a distal end of the respective support portion, the respective support portion slidably crossing over the respective structure-attachment portion for further supporting the respective pot-lid-handle-engaging portion in a direction perpendicular to the downstream direction.

The pot-lid-handle-engaging portions of either or both the first and second gripping elements may be locally or entirely straight as defined further below.

The structure-attachment, return and pot-lid-handle-engaging portions of either or both the first and second gripping elements, including support portions where provided, may be based on the same monolithic length of material, also as defined further below.

It is to be understood that this summary is provided as a means of generally determining what follows in the drawings and detailed description and is not intended to limit the scope of the invention. Objects, features and advantages of the invention will be readily understood upon consideration of the following detailed description taken in conjunction with the accompanying drawings.

BRIEF DESCRIPTION OF DRAWINGS

FIG. 3 is a section view of the pot lid storage holder of FIGS. 1 and 2, FIG. 3 corresponding to FIG. 1 and taken along the line 3-3 of FIG. 2, showing bending of the gripping elements as a result of receiving the neck of a knob-shaped therebetween.

FIG. 5 is a side elevation of the pot lid storage holder of FIG. 1 in an upwardly angled orientation.

FIG. 6 is a plan view of a relatively simple pot lid storage holder according to the present invention.

FIG. 7 is a front view of the pot lid storage holder of FIG. 6, viewed in the direction indicated as 7-7 therein.

FIG. 8 is an isometric view of a pot lid storage holder having an additional support leg according to the present invention.

FIG. 9 is a plan view of the pot lid storage holder of FIG. 8.

FIG. 10 is a front view of the pot lid storage holder of FIG. 8, viewed in the direction indicated as 9-9 in FIG. 8.

DESCRIPTION OF PREFERRED EMBODIMENTS

Figure 1:
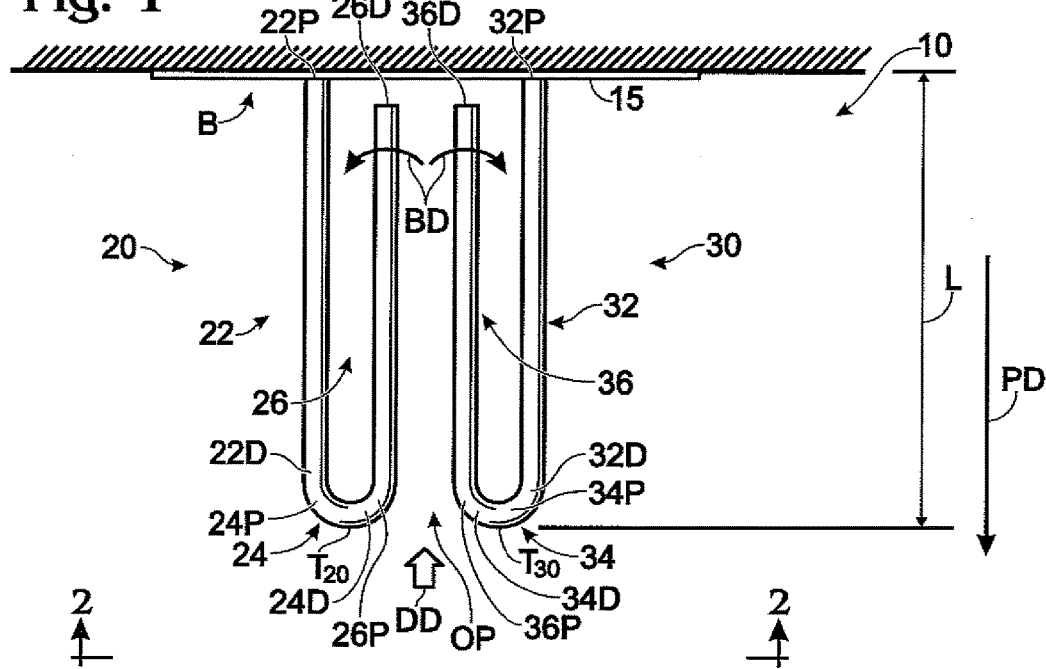
FIG. 1 is a plan view of a pot lid storage holder according to the present invention, showing two gripping elements.

FIG. 1 illustrates a simple pot lid storage holder 10 according to the present invention, for holding just one pot lid, it being understood that a pot lid organizer may have multiple instances of the holder 10.

The holder 10 utilizes, in a preferred embodiment, two spaced-apart generally "U" shaped gripping elements 20 and 30 arranged in a plane, i.e., the plane of the Figure. The gripping elements are preferably of identical construction except for being mirror images of each other about a mirror plane "MP" which shows as a line in FIG. 1.

The connection that the U-shaped elements make with a supporting structure, such as a rack that sits on a table or counter-top, or which hangs on a kitchen or cabinet door, or which is mounted to a wall or interior or exterior surface of a cabinet, all commonplace, is not particularly important and this detail is therefore omitted from the discussion and most of the Figures.

Each gripping element (20, 30) includes a number of sequentially connected legs, where the term "leg" is used to refer to a generally elongate structural element, including elongate structural elements that have bends and therefore define non-linear shapes, such as a "U" shape, or a "V" shape.

More particularly, each gripping element (20, 30) has, respectively, a structure-attachment leg (22, 32) corresponding to one of the legs of a "U" connected to a support structure 15 at a proximal end (22P, 32P) of the structure-attachment leg which establishes a base "B" of the pot lid storage holder 10, the structure-attachment leg terminating at a distal end (22D, 32D) thereof; a return leg (24, 34) through which the gripping element bends, corresponding to the bottom portion of the "U," connected to the distal end of the structure-attachment leg at a proximal end (24P, 34P) of the return leg, which terminates at a distal end (24D, 34D) thereof; and a pot-lid-handle-engaging leg (26, 36) corresponding to the other leg of the "U" connected to the distal end of the return leg at a proximal end (26P, 36P) of the pot-lid-handle-engaging leg, and terminating at a distal end (26D, 36D) thereof.

It may be noted that the pot-lid-handle-engaging legs are cantilever supported against bending toward the structure-attachment legs by the return legs, and this is true even in the case where there is an added support leg as described further below.

The return legs (24, 34) project or extend furthest from the base B in the projection direction "PD" indicated in FIG. 1, each extending to a respective terminus "$T_{20}$" and "$T_{30}$," and are spaced apart so as to define an entry opening "OP" of the pot lid storage holder 10 therebetween.

Figure 2:
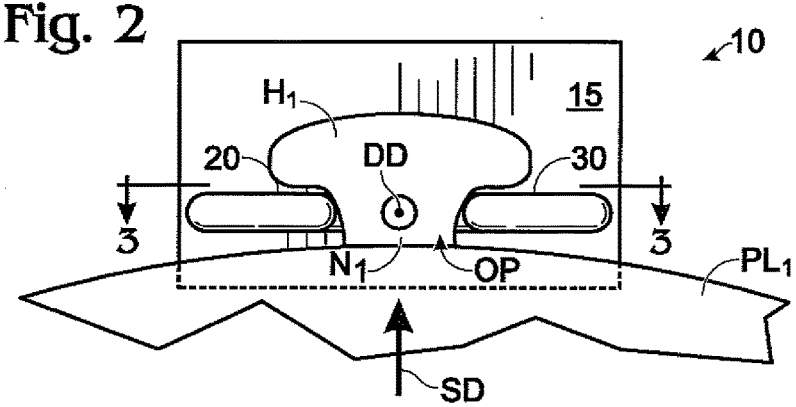
FIG. 2 is a front view of the pot lid storage holder of FIG. 1 in a horizontal orientation, viewed in the direction indicated as 2-2 therein, showing a pot lid having a knob-like handle being held thereby.

With additional reference to FIG. 2, the entry opening OP of the pot lid storage holder 10 is for conveniently receiving the necked down portion or neck "$N_1$" of a knob-shaped handle "$H_1$" of a pot lid "$PL_1$," in what will be referred to as a "downstream" direction of insertion "DD" of the pot lid into the pot lid storage holder pointing toward the base B, allowing for a user of the pot lid storage holder to slide the neck along and between the two pot-lid-handle-engaging legs, by pushing the pot lid into and past the entry opening in the downstream direction a desired depth of insertion or insertion amount "IA," resulting in the pot lid hanging from the pot lid storage holder by the handle, the full weight (in this embodiment) of the pot lid being supported in a support direction "SD" that is perpendicular to the loading direction by the pot-lid-handle-engaging legs, so as to require no additional contact with the pot lid storage holder, or with any other structure or surface.

As indicated in FIG. 3, as the pot lid is pushed past the entry opening OP so that the handle progresses from the entry opening in the direction toward the base, the pot-lid-handle-engaging legs are forced apart by the neck portion, while at the same time making interference contact with the relatively large portion of the handle so as to provide the above-described support, and in response they "elastically," i.e., recoverably, bend about the return portion (bending indicated as "BD" in FIG. 1), toward the structure-attachment legs, and do so more easily with greater depth of progression. This gradient in the force required to spread the pot-lid-handle-engaging legs tends to securely seat the pot lids in the pot lid storage holder even in cases where the plane of the gripping portions is horizontal so that there is no gravitational assist.

A seating function could also or alternatively be provided by strategically placed kinks or jogs in the pot-lid-handle-engaging leg(s), but this would limit the flexibility of the pot lid storage holder to seat pot lids of varying sizes, and it may also be perceived by a user of the holder to be tactilely undesirable when loading pot lids into, or unloading the pot lids from, the holder. So while such features could be provided, the pot-lid-handle-engaging legs are preferably "locally straight," meaning for purposes herein that at least the edges thereof which make contact with the neck portions of the handles of the pot lids the holder is designed to hold do not deviate from a straight line, over any length X thereof which is equal to about 2 inches, by more than about ⅛ inch.

It can be appreciated from FIG. 3 that the distal ends (26D, 36D) of the pot-lid-handle-engaging legs are spread farther apart from each other than the proximal ends (26P, 36P) as a result of inserting the neck $N_1$ of the handle between the two legs, and that this would not be the case if, for example, the distal ends of these legs were bridged or tied together; and that the same two legs are also not subject to any bending forces downstream of the neck regardless of the insertion amount, as they would be, again for example, if the distal ends were bridged or tied together.

The pot-lid-handle-engaging legs should be at least 4 inches long, measured in the direction PD of FIG. 1, and preferably at least 6 inches long, but would typically not be more than 20 inches long. The pot-lid-handle-engaging legs are preferably "entirely straight," meaning for purposes herein that at least the edges thereof which make contact with the neck portions of the handles of the pot lids the holder is designed to hold do not deviate from a straight line, over the entireties of their lengths, by more than about ¼ inch.

Figure 4:
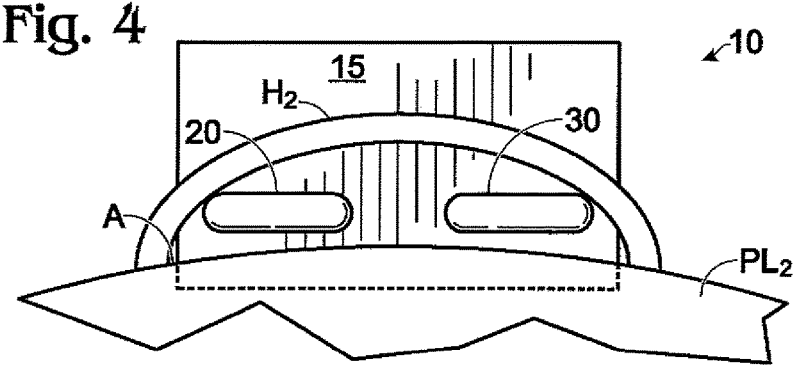
FIG. 4 is a front view of the pot lid storage holder of FIG. 1 in a horizontal orientation, showing a pot lid having a drawer-pull type handle being held thereby.

With reference to FIG. 4, the pot lid storage holder 10 can receive handles of the drawer-pull type by maneuvering the pot lid so as to pass the structure defining the aperture "A" of the handle around the structure-attachment legs, and so as to result in the whole of the gripping elements extending through the aperture.

With reference to FIG. 5, to help seat the pot lids in this circumstance, the base B may be adapted so that the plane of the gripping portions is angled upwardly (vertical orientation indicated as "V"), so that the entry opening OP of the pot lid storage holder is at a higher elevation than the base.

Each of the gripping elements 20 independently, or both of the gripping elements in combination, may be economically provided by bending a monolithic length of metal rod, preferably steel and more preferably stainless steel, of between about ⅛ and ½ inch diameter, and preferably about 3/16 inch diameter. Alternatively, raw metals, plastics, or other materials could be used, with the legs having varying shapes and/or sizes, and which may joined, molded or cast.

A bent metal rod may be provided with a coating, such as paint or plastic, which may be applied by spraying or dipping. For purposes of definition, two or more legs of a single gripping element, or two or more gripping elements, are "based on" the same monolithic length of material if each of them includes portions of the same length of material, regardless of the provision of additional elements or features such as coatings or additional structural supports such as the support leg described further below. For example, both gripping elements of the holder 200 shown in FIG. 8 are based on the same length of material, in this case the material being a single metal rod which may or may not be coated or joined with another material.

To provide the aforementioned seating feature, the pot-lid-handle-engaging legs, in addition to "elastically" bending toward the structure-attachment legs in response to being spread apart such as by being forced to receive the neck portion of the handle of a pot lid therebetween, should also "preferentially" bend toward the structure-attachment legs, meaning that the distal ends of the pot-lid-handle engaging legs will move farther in response to such forcing than will the distal ends of either the structure-attachment legs or the return legs. This feature is a natural consequence of forming a gripping element from a monolithic length of material having the same cross-sectional size and shape along its length, as may be appreciated by observing the bending indicated as BD in FIG. 1, but it may be provided in other ways.

FIGS. 6 and 7 show a pot lid storage holder 100 that is in some respects even simpler than the pot lid storage holder 10. The feasibility of this embodiment can be appreciated by noting that each gripping element (20, 30) of the pot lid storage holder 10 functions in mirror-image symmetry. Thus, either gripping element could in principle be replaced with a rigid structure and the remaining gripping element would function the same as it did in the holder 10.

According to this principle, the pot lid storage holder 100 has a gripping element 40 which may be constructed the same as the elements (20, 20) of the pot lid storage holder 10, and having a pot-lid-handle-engaging leg 42, paired with a simplified cantilevered member 44 that can be made relatively rigid, as compared to the gripping element 40 generally, and as compared to the pot-lid-holder-engaging leg 42 in particular, in response to bending in the plane of the gripping element 40 in a variety of ways as will be readily appreciated by persons of ordinary mechanical skill.

Turning now to FIGS. 8-10, a pot lid storage holder 200 has two gripping elements (50, 60) that provide an additional support feature by use of support legs (58, 68). Proximal ends (58P, 68P) of the support legs are connected to distal ends (56D, 66D) of pot-lid-handle-engaging legs (56, 66); the support legs slidably cross over the respective structure-attachment legs (52, 62) to terminate in at distal ends (58D, 68D).

When the pot lid storage holder is oriented relative to the vertical as noted in FIG. 10 (direction "V"), the support legs are supported by the structure-attachment legs so that the pot-lid-handle-engaging legs are better able to support the load of a pot lid "PL" hanging from the holder. Providing that the distal ends of the structure-attachment legs extend laterally (or horizontally relative to the vertical direction V) beyond the structure-attachment legs provides for this additional support over a range of bending of the pot-lid-handle-engaging legs so as to accommodate pot lids having handles with necks of varying sizes.

Figure 11:
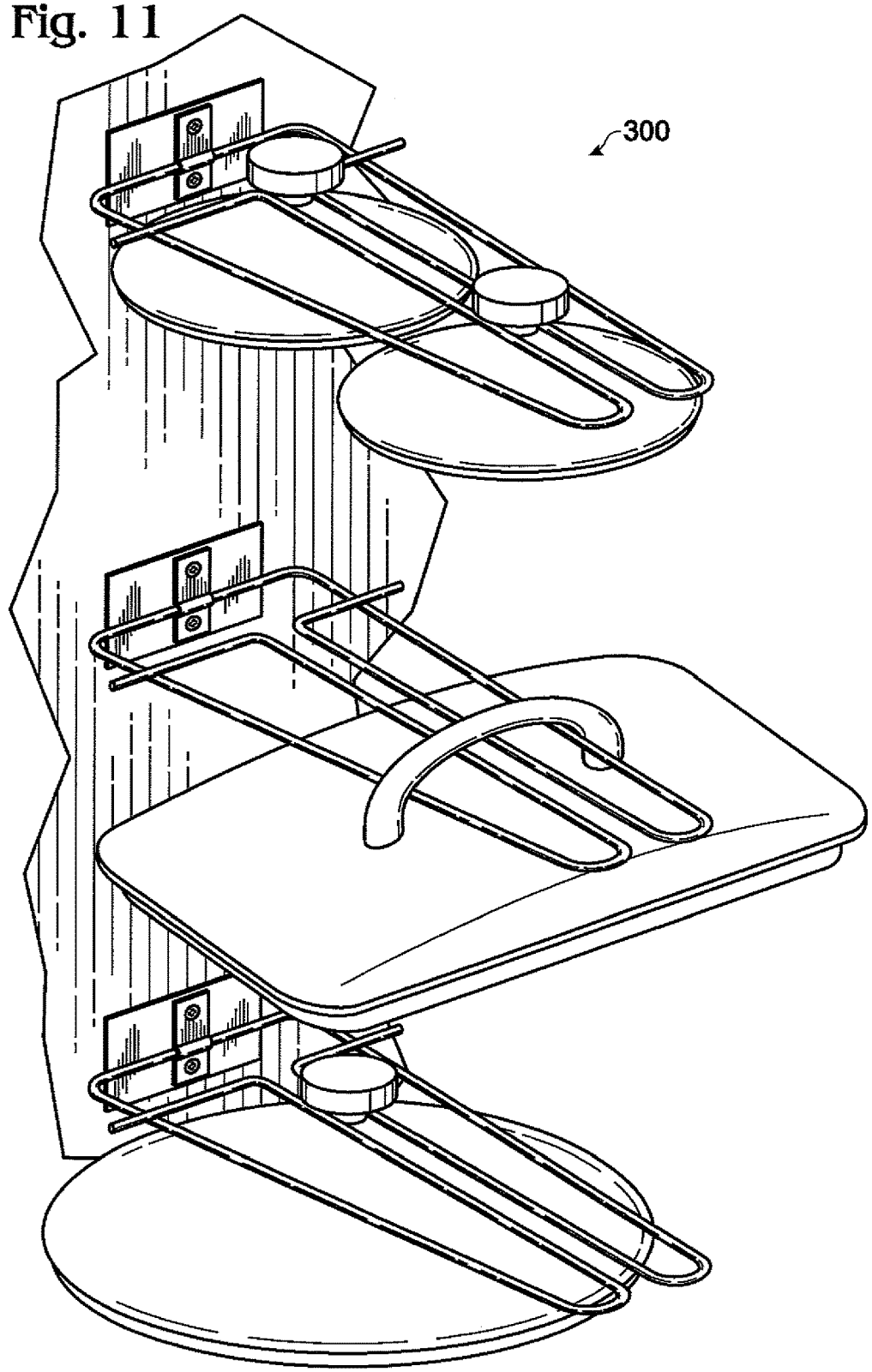
FIG. 11 is an isometric view of a pot lid storage holder according to the present invention.

FIG. 11 shows a pot lid organizer 300 according to the invention. The distinction between a pot lid storage holder and a pot lid organizer is merely that the latter will have multiple sets of gripping elements, allowing for a multiplicity of pot lids to be held and therefore organized. Various examples are shown.

Figure 12:
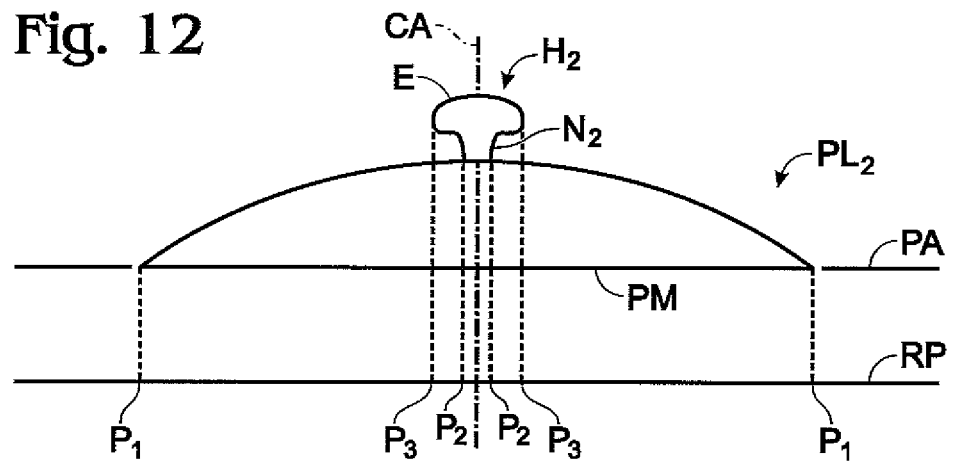
FIG. 12 is a side elevation of a pot lid.
Figure 13:
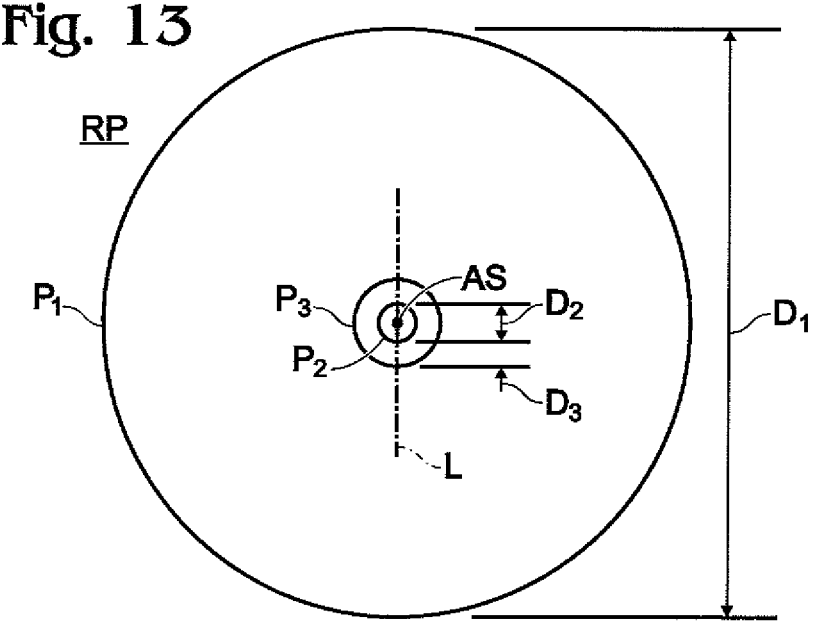
FIG. 13 is a plan view of the pot lid of FIG. 12.

FIGS. 12 and 13 are provided for reference. FIG. 12 shows a pot lid "$PL_2$" having a handle "$H_2$" with a neck "$N_2$," the necked-down portion of the handle being disposed between the pot lid and an enlarged portion "E" of the handle, as is typical. The pot lid has an outer perimeter "PM" which lies in a plane "PA," which enables the pot lid to seat on a pot, or rest on a table-top. Projecting the pot lid onto any plane parallel to the plane PA, such as the reference plane "RP," provides a plan view of the pot lid.

A pot lid also defines a central axis "CA" which is perpendicular to the plane PA and which extends through the center of mass of the pot lid.

Pot lids typically possess 360 degree rotational symmetry about their central axes, so that features thereof project as circles onto reference planes, such as shown in FIG. 13. But the symmetry of a pot lid can be less than 360 degrees. As just one example, the outer perimeter of a pot lid may be appear substantially rectangular in a plan view, in which case it has only 180 degree rotational symmetry.

With reference to both FIGS. 12 and 13, a projection "$P_1$" of a pot lid onto a reference plane RP typically extends a maximum distance of about 20 inches, and a minimum distance of about 4 inches. In the usual case where the pot lid is rotationally symmetric, the maximum and minimum distances are the same and are equal to a diameter "$D_1$" of the projection, of between about 4 and 20 inches.

A projection "$P_2$" of the necked-down portion of the handle of a pot lid onto a reference plane RP typically extends a maximum distance of about 2 inches, and a minimum distance of about ½ inch. In the usual case where the pot lid is rotationally symmetric, the maximum and minimum distances are the same and are equal to a diameter "$D_2$" of the projection, of between about ½ and 2 inches.

There is typically at least one line "L" that can be drawn in a reference plane RP, that intersects both the projection $P_2$ and a projection "$P_3$" of the relatively enlarged portion E of the handle onto the reference plane, along which the projection $P_3$ extends, on both sides of the projection $P_2$, at least about ⅛ inch. In the usual case where the pot lid is rotationally symmetric, the maximum and minimum distances are the same and are equal to a value "$D_3$" of at least about ⅛ inch; and the line L is not unique—there are a theoretically infinite number of such lines.

A pot lid typically weighs between about ¼ pound and 5 pounds.

It is to be understood that, while a specific pot lid storage holder has been shown and described as being preferred, variations may be made, in addition to those already mentioned, without departing from the principles of the invention.

The terms and expressions which have been employed in the foregoing specification are used therein as terms of description and not of limitation, and there is no intention in the use of such terms and expressions to exclude equivalents of the features shown and described or portions thereof, it being recognized that the scope of the invention is defined and limited only by the claims which follow.

The invention claimed is:

1. A pot lid storage holder, configured for storing a pot lid having a handle with a necked-down portion disposed between the pot lid and a relatively enlarged portion of the handle, the holder comprising first and second gripping elements spaced apart from one another, each gripping element having a first respective substantially straight portion fixedly attached to and projecting from a mounting member, a respective return portion connected to said first respective substantially straight portion, and a second respective substantially straight portion connected to said respective return portion, projecting back toward but short of said mounting member and having an end that is free to move with respect to said mounting member, the second respective substantially straight portions of the first and second gripping elements being substantially parallel to one another in an undeflected state and configured to receive the necked-down portion of the handle, through an opening there between, in a downstream direction of insertion of the pot lid into the pot lid storage holder pointing toward the mounting member so as to deflect at least one of said first and second substantially straight portions which thereby exerts a compressive spring force on the necked-down portion that decreases with increasing depth of insertion of the necked down portion of the handle in the downstream direction.

2. A pot lid storage holder, configured for storing a pot lid having a handle with a necked-down portion disposed between the pot lid and a relatively enlarged portion of the handle, the holder comprising first and second gripping elements projecting from a base, the first and second gripping elements being configured to receive through an opening there between, in a downstream direction of insertion of the pot lid into the pot lid storage holder pointing toward the base, the necked-down portion of the handle, and to exert a compressive spring force on the necked-down portion that decreases with increasing depth of insertion of the necked down portion of the handle in the downstream direction, wherein the first gripping element includes a structure-attachment portion, a return portion, and a pot-lid-handle-engaging portion, the structure-attachment portion connected to the base at a proximal end of the structure-attachment portion and terminating at a distal end of the structure-attachment portion, the return portion connected to the distal end of the structure-attachment portion at a proximal end of the return portion and terminating at a distal end of the return portion, the pot-lid-handle-engaging portion connected to the distal end of the return portion at a proximal end of the pot-lid-handle-engaging portion and terminating at a distal end of the pot-lid-handle-engaging portion, the return portion defining a terminus of the first gripping element that is spaced farther from the base than the structure-attachment and wherein the second gripping element defines a terminus corresponding to the terminus of the first gripping element, and also defines a pot-lid-handle-engaging portion corresponding to the pot-lid-handle-engaging portion of the first gripping element, the first and second gripping elements spaced apart from each other so as to define said opening, the first and second gripping elements configured so that, as a result of receiving the necked-down portion of the handle there between an insertion amount, (a) the pot-lid-handle-engaging portion of the first gripping element is elastically spread apart from the pot-lid-handle-engaging portion of the second gripping element, (b) the distal end of the pot-lid-handle-engaging portion of the first gripping element is spread farther apart from the pot-lid-handle-engaging-portion of the second gripping element than the proximal end of the pot-lid-handle-engaging portion of the first gripping element, and the pot-lid-handle-engaging portions of the first and second gripping elements are not subjected to any substantial bending forces downstream of the necked-down portion of the handle regardless of the insertion amount, the pot-lid-handle-engaging portions of the first and second gripping elements providing support for the relatively enlarged portion of the handle and thereby holding the pot lid, and wherein the first gripping element includes a support portion connected to the distal end of the pot-lid-handle-engaging portion at a proximal end of the support portion and terminating at a distal end of the support portion, the support portion slidably crossing the structure-attachment portion to provide further support for the pot-lid-handle-engaging portion in a direction perpendicular to the downstream direction.

3. The pot lid storage holder of claim 2, wherein the structure-attachment portion, return portion, pot-lid-handleengaging portion, and support portions are based on the same monolithic length of material.

4. A pot lid storage holder, configured for storing a pot lid having a handle with a necked-down portion disposed between the pot lid and a relatively enlarged portion of the handle, the holder comprising first and second gripping elements projecting from a base, the first and second gripping elements configured to receive through an opening there between, in a downstream direction of insertion of the pot lid into the pot lid storage holder pointing toward the base, the necked-down portion of the handle, and to exert a compressive spring force on the necked-down portion that decreases with increasing depth of insertion of the necked down portion of the handle in the downstream direction, wherein the first gripping element includes a structure-attachment portion, a return portion, and a pot-lid-handle-engaging portion, the structure-attachment portion connected to the base at a proximal end of the structure-attachment portion and terminating at a distal end of the structure-attachment portion, the return portion connected to the distal end of the structure-attachment portion at a proximal end of the return portion and terminating at a distal end of the return portion, the pot-lid-handle-engaging portion connected to the distal end of the return portion at a proximal end of the pot-lid-handle-engaging portion and terminating at a distal end of the pot-lid-handle-engaging portion, the return portion defining a terminus of the first gripping element that is spaced farther from the base than the structure-attachment and pot-lid-handle-engaging portions, and wherein the second gripping element defines a terminus corresponding to the terminus of the first gripping element, and also defines a pot-lid-handle-engaging portion corresponding to the pot-lid-handle-engaging portion of the first gripping element, the first and second gripping elements spaced apart from each other so as to define said opening, the first and second gripping elements configured so that, as a result of receiving the necked-down portion of the handle there between an insertion amount, (a) the pot-lid-handle-engaging portion of the first gripping element is elastically spread apart from the pot-lid-handle-engaging portion of the second gripping element, (b) the distal end of the pot-lid-handle-engaging portion of the first gripping element is spread farther apart from the pot-lid-handle-engaging-portion of the second gripping element than the proximal end of the pot-lid-handle-engaging portion of the first gripping element, and the pot-lid-handle-engaging portions of the first and second gripping elements are not subjected to any substantial bending forces downstream of the necked-down portion of the handle regardless of the insertion amount, the pot-lid-handle-engaging portions of the first and second gripping elements providing for supporting the relatively enlarged portion of the handle and thereby holding the pot lid, the second gripping element having a structure-attachment portion, a return portion, and a pot-lid-handle-engaging portion, the structure-attachment portion of the second gripping element connected to the base at a proximal end of the structure-attachment portion of the second gripping element and terminating at a distal end of the structure-attachment portion of the second gripping element, the return portion of the second gripping element connected to the distal end of the structure-attachment portion of the second gripping element at a proximal end of the return portion of the second gripping element and terminating at a distal end of the return portion of the second gripping element, the pot-lid-handle-engaging portion of the second gripping element connected to the distal end of the return portion of the second gripping element at a proximal end of the pot-lid-handle-engaging portion of the second gripping element and terminating at a distal end of the pot-lid-handle-engaging portion of the second gripping element, the return portion of the second gripping element defining a terminus of the second gripping element that is spaced farther from the base than the structure-attachment and pot-lid-handle-engaging portions of the second gripping element, and wherein the first gripping element includes a support portion connected to the distal end of the pot-lid-handle-engaging portion of the first gripping element at a proximal end of the support portion of the first gripping element and terminating at a distal end of the support portion of the first gripping element, the support portion slidably crossing the structure-attachment portion of the first gripping element for further supporting the pot-lid-handle-engaging portion of the first gripping element in a direction perpendicular to the downstream direction, and wherein the second gripping element includes a support portion connected to the pot-lid-handle-engaging portion of the second gripping element at a proximal end of the support portion of the second gripping element and terminating at a distal end of the support portion of the second gripping element, the support portion of the second gripping element slidably crossing the structure-attachment portion of the second gripping element for further supporting the pot-lid-handle-engaging portion of the second gripping element in a direction perpendicular to the downstream direction.

5. The pot lid storage holder of claim 4, wherein the structure-attachment portion, return portion, pot-lid-handle-engaging portion, and support portions of the first gripping element are based on the same monolithic length of material, and the structure-attachment portion, return portion, pot-lid-handle-engaging portion, and support portions of the second gripping element are based on the same monolithic length of material.

6. The pot lid storage holder of claim 4, wherein the structure-attachment portions, return portions, pot-lid-handle-engaging portions, and support portions of both the first and second gripping elements are based on the same monolithic length of material.

7. The pot lid holder of claim 1, wherein said mounting member is adapted to prevent rotation of respective said first substantially straight portions of said first and second gripping elements about an axis parallel thereto.

8. The pot lid holder of claim 7, wherein said mounting member includes means for fastening said first substantially straight portions of said first and second gripping elements to a mounting surface at two or more separated locations.

9. The pot lid holder of claim 1, wherein the mounting member defines a first plane and the first and second gripping members lie substantially in a second plane, the first and second planes being non-perpendicular to one another.

10. The pot lid holder of claim 1, wherein the first respective substantially straight portions of the first and second gripping members are made of sufficiently flexible material and configured side by side so that when a drawer-pull type, arcuate, or U-shaped handle of a pot lid is placed over both gripping members and has a sufficiently narrow interior to engage the outer edges of their respective first substantially straight members those nominally substantially straight members will flex inwardly so as to receive and retain the pot lid handle.

11. A pot lid storage holder, configured for storing a pot lid having a handle with a necked-down portion disposed between the pot lid and a relatively enlarged portion of the handle, the holder comprising first and second gripping elements spaced apart from one another, each gripping element having a first respective substantially straight portion projecting from a mounting member, a respective return portion connected to said first respective substantially straight portion, and a respective substantially straight second portion connected to said respective return portion, projecting back toward but short of said mounting member at a distal position, the first and second gripping elements being configured to receive the necked-down portion of the handle, through an opening there between, in a downstream direction of insertion of the pot lid into the pot lid storage holder pointing toward the base mounting member, and to exert a compressive spring force on the necked-down portion that decreases with increasing depth of insertion of the necked down portion of the handle in the downstream direction, the respective substantially straight second portions each having a support portion disposed at its distal position, the respective support portions being anti-parallel to and slidably crossing the respective first substantially straight portion of its respective gripping element for further supporting the pot-lid-handle-engaging portion.

12. The pot lid storage holder of claim 11, wherein in an undeflected state at least one support portion is substantially perpendicular to its respective first substantially straight portion.

13. The pot lid storage holder of claim 11, wherein the mounting member and first substantially straight portions, return portions, and second substantially straight portions of the first and second gripping elements are fabricated from the same monolithic material.

14. The pot lid storage holder of claim 11, wherein the mounting member, first substantially straight portions, return portions, and second substantially straight portions comprise a continuous length of monolithic material.

15. The pot lid storage holder of claim 14, wherein said continuous length of monolithic material comprises a single length of wire formed to create the mounting member, first substantially straight portions, return portions, and second substantially straight portions comprise a continuous length of monolithic material.

16. The pot lid holder of claim 11, wherein the mounting member defines a first plane and the first and second gripping elements lie substantially in a second plane, the first and second planes being non-perpendicular to one another.

17. The pot lid holder of claim 11, wherein the first respective substantially straight portions of the first and second gripping elements are made of sufficiently flexible material and configured side by side so that when a drawer-pull type, arcuate, or U-shaped handle of a pot lid is placed over both gripping members and has a sufficiently narrow interior to engage the outer edges of their respective first substantially straight portions those substantially straight portions will flex inwardly so as to receive and retain the pot lid handle.

18. A pot lid storage holder, configured for storing a pot lid having a handle with a necked-down portion disposed between the pot lid and a relatively enlarged portion of the handle, the holder comprising first and second gripping elements projecting from a common mounting member, at least one of the gripping elements having a first substantially straight portion, a return portion connected to the first substantially straight portion, and a second substantially straight portion connected to the return portion and projecting back toward but short of the mounting member, the second substantially straight portion of the at least one gripping element and the other gripping element being configured to receive through an opening there between, in a downstream direction of insertion of the pot lid into the pot lid storage holder pointing toward the mounting member, the necked-down portion of the handle, and to exert a compressive spring force on the necked-down portion that decreases with increasing depth of insertion of the necked down portion of the handle in the downstream direction, the at least one of the gripping elements having a support portion disposed at a proximal end of the at least one of the gripping elements nearest the mounting member, the support portion being anti-parallel to and slidably crossing the at least one gripping element for further supporting the second substantially straight portion thereof.

19. A pot lid storage holder, configured for storing a pot lid having a handle, the holder comprising first and second gripping elements spaced apart from one another, each gripping element having a first respective substantially straight portion fixedly attached to and projecting from a mounting member, a respective return portion connected to said first respective substantially straight portion, and a respective substantially straight second portion connected to said respective return portion, projecting back toward but short of said mounting member, and having an end that is free to move with respect to said mounting member, wherein the first respective substantially straight members of the first and second gripping elements are made of sufficiently flexible material and configured so that when a pot lid handle having an pull-type, arcuate, or U-shaped handle is placed over both gripping elements and is sufficiently narrow to engage the outer edges of their respective first substantially straight portions those substantially straight portions will flex inwardly so as to receive and retain the pot lid handle and said second substantially straight members are contoured so as to slide by one another laterally when deflected inwardly.

20. A pot lid storage holder, configured for storing a pot lid having a handle, the holder comprising first and second gripping elements spaced apart from one another, each gripping element having a first respective substantially straight portion fixedly attached to and projecting from a mounting member, a respective return portion connected to said first respective substantially straight portion, and a respective substantially straight second portion connected to said respective return portion, projecting back toward but short of said mounting member, and having an end that is free to move with respect to said mounting member, wherein the first respective substantially straight portion of the first and second gripping elements are made of sufficiently flexible material and configured so that when a drawer-pull type, arcuate or U-shaped handle of a pot lid is placed over both gripping elements and has a sufficiently narrow interior to engage the outer edges of their respective first substantially straight portions those substantially straight portions will flex inwardly so as to receive and retain the pot lid handle and said second substantially straight members are contoured so as to slide by one another laterally when deflected inwardly.

21. The pot lid storage holder of claim 1, wherein said respective first substantially straight portions of said first and second gripping elements are substantially parallel to one another in an undeflected state.

22. The pot lid storage holder of claim 1, wherein said return portion makes a substantially one hundred and eighty degree reversal in direction.

23. The pot lid storage holder of claim 22, wherein said mounting member, first substantially straight portions, return members and second substantially straight portions all comprise a monolithic member.

24. The pot lid holder of claim 23, wherein said monolithic member is a substantially single wire.

\* \* \* \* \*